(12) United States Patent
Katayama

(10) Patent No.: US 7,657,904 B2
(45) Date of Patent: Feb. 2, 2010

(54) PROGRAM VIEWING CONTROL APPARATUS

(75) Inventor: Takahiro Katayama, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 402 days.

(21) Appl. No.: 11/819,302

(22) Filed: Jun. 26, 2007

(65) Prior Publication Data

US 2008/0127242 A1    May 29, 2008

(30) Foreign Application Priority Data

Jun. 26, 2006    (JP)    ............... 2006-175626

(51) Int. Cl.
*H04N 7/16*    (2006.01)
(52) U.S. Cl. ............... 725/28; 725/25; 725/26; 725/27; 725/29; 725/30
(58) Field of Classification Search ............. 725/25, 725/26, 27, 28, 29, 30
See application file for complete search history.

(56) References Cited

U.S. PATENT DOCUMENTS

| | | | | |
|---|---|---|---|---|
| 5,969,748 A * | 10/1999 | Casement et al. | ............. | 725/27 |
| 5,995,133 A * | 11/1999 | Kim | ............. | 725/28 |
| 6,230,320 B1 * | 5/2001 | Gakumura | ............. | 725/25 |
| 6,449,766 B1 * | 9/2002 | Fleming | ............. | 725/28 |
| 6,493,744 B1 * | 12/2002 | Emens et al. | ............. | 709/203 |
| 6,493,878 B1 * | 12/2002 | Kassatly | ............. | 725/144 |
| 6,684,240 B1 | 1/2004 | Goddard | | |
| 7,210,158 B1 * | 4/2007 | Forler | ............. | 725/31 |

FOREIGN PATENT DOCUMENTS

| | | |
|---|---|---|
| JP | 2000-134554 A | 5/2000 |
| JP | 2000-152208 A | 5/2000 |
| JP | 2001-16565 A | 1/2001 |
| JP | 2002-199367 A | 7/2002 |
| JP | 2003-517766 A | 5/2003 |

OTHER PUBLICATIONS

Japanese Office Action dated Apr. 15, 2008 with English translation (Four (4) pages).

* cited by examiner

*Primary Examiner*—Christopher Kelley
*Assistant Examiner*—Sahar A Baig
(74) *Attorney, Agent, or Firm*—Crowell & Moring LLP

(57) ABSTRACT

A program viewing control apparatus includes: a detection unit for detecting rating information regarding a viewing lock level of contents, which is added to data of the contents; a storing unit for storing rating information regarding the viewing lock level; a control unit for locking the contents based on comparison between the rating information detected by the detection unit and the rating information stored in the storing unit; a selection unit for inputting a selection signal for selecting whether to limit viewing of the contents or not when contents video based on data of the contents is displayed on a display section; and an update unit for updating the rating information stored in the storing unit based on the selection signal inputted from the selection unit.

6 Claims, 6 Drawing Sheets

PROGRAM VIEWING CONTROL APPARATUS

BACKGROUND OF THE INVENTION

1. Field of the Invention

The present invention relates to a program viewing control apparatus.

2. Description of the Related Art

Conventionally, a television broadcasting reception apparatus in which in order to prevent a program including a violent expression or a pornographic expression from being viewed by children, a broadcasting station adds viewing lock level information (rating information) to a broadcasting signal of the program to limit the viewing of the program based on this rating information, has been known. For example, a television broadcasting recording apparatus for carrying out the viewing lock even in fast play or slow play operation, has been known (see Patent Publication 1 for example).

When such a viewing lock is set, an adult user always must change the setting of the viewing lock in order to view a broadcasting program. Therefore, it is inconvenient. To prevent this, another television broadcasting reception apparatus in which a set viewing lock can be temporarily invalidated without changing the setting information of the viewing lock, has been known (Patent Publication 2 for example). Further, another apparatus in which a set viewing lock can be invalidated by inputting a password, also has been known (Patent Publication 3 for example).

[Patent Publication 1] Japanese Patent Unexamined Publication No. 2001-016565
[Patent Publication 2] Japanese Patent Unexamined Publication No. 2000-134554
[Patent Publication 3] Japanese Patent Unexamined Publication No. 2002-199367

Each user sets a viewing lock by selecting a viewing lock level based on the age of his or her child or the like. However, the user cannot know which viewing lock level a program to be locked has. Thus, there is some possibility that a selected viewing lock level is different from a viewing lock level of the program to be locked. As a result, a problem that a program to be locked cannot be securely locked is caused.

SUMMARY OF THE INVENTION

An object of the present invention is to provide a program viewing control apparatus in which a viewing lock can be set in an easier and more secure manner.

In accordance with a first aspect of the invention, a program viewing control apparatus comprises:

a detection unit for detecting rating information regarding a viewing lock level of contents, which is added to data of the contents;

a storing unit for storing rating information regarding the viewing lock level;

a control unit for locking the contents based on comparison between the rating information detected by the detection unit and the rating information stored in the storing unit;

a selection unit for inputting an input signal for updating the rating information stored in the storing unit and inputting a selection signal for selecting whether to limit viewing of the contents or not when contents video based on data of the contents is displayed on a display section;

a display control unit for causing the rating information stored in the storing unit to be displayed on the display section, when the input signal for updating the rating information stored in the storing unit is inputted from the selection unit;

an update unit for updating the rating information stored in the storing unit so that the viewing of contents having not less than the viewing lock level of the contents is limited when the selection signal for limiting the viewing of the contents is inputted from the selection unit, and for updating the rating information stored in the storing unit so that the viewing of contents having not more than the viewing lock level of the contents is allowed when the selection signal for not limiting the viewing of the contents is inputted from the selection unit; and a personal identification information input unit for inputting personal identification information;

wherein in case that the control unit does not limit the viewing of the contents, the update unit verifies the personal identification information inputted from the personal identification information input unit and updates the rating information stored in the storing unit based on the selection signal inputted from the selection unit when the personal identification information inputted from the personal identification information input unit matches with personal identification information which is previously registered; and wherein in case that the control unit limits the viewing of the contents, the update unit verifies the personal identification information inputted from the personal identification information input unit and cancels the limiting of the viewing of the contents when the personal identification information inputted from the personal identification information input unit matches with the personal identification information which is previously registered.

According to the first aspect of the invention, the detection unit detects the rating information regarding a viewing lock level of contents, which is added to data of the contents. The storing unit stores the rating information regarding the viewing lock level. The control unit compares the rating information detected by the detection unit with the rating information stored in the storing unit to lock the contents. When the contents video based on data of the contents is displayed on the display section, the selection unit inputs a selection signal for selecting whether to limit the viewing of the contents or not. Then, the update unit updates the rating information stored in the storing unit based on the selection signal inputted from the selection unit. Thus, a user can determine whether to limit the viewing of the contents or not while user actually views the contents. Therefore, the user can securely lock the contents to be locked without knowing the viewing lock level of the contents. Further, the viewing lock can be set in an easier and more secure manner.

Furthermore, the update unit updates the rating information stored in the storing unit so that the viewing of contents having not less than the viewing lock level of the contents is limited when the selection signal for limiting the viewing of the contents is inputted from the selection unit. The update unit updates the rating information stored in the storing unit so that the viewing of contents having not more than the viewing lock level of the contents is allowed when the selection signal for not limiting the viewing of the contents is inputted from the selection unit. Thus, the setting of a viewing lock level for one kind of contents enables the setting of a viewing lock level for contents having a viewing lock level equal to or higher than the viewing lock level of the one kind of contents. Therefore, a viewing lock level can be set in a more efficient manner.

Furthermore, the personal identification information input unit inputs personal identification information, the update unit verifies the personal identification information inputted from the personal identification information input unit and updates the rating information stored in the storing unit based on the selection signal inputted from the selection unit when the personal identification information inputted from the personal identification information input unit matches with personal identification information which is previously registered. Thus, only a person knowing the personal identification information can set a viewing lock to prevent a child not knowing the personal identification number for example from tampering the setting of a viewing lock.

Furthermore, the personal identification information input unit inputs personal identification information. In case that the control unit limits the viewing of the contents, the update unit verifies the personal identification information inputted from the personal identification information input unit and cancels the limiting of the viewing of the contents when the personal identification information inputted from the personal identification information input unit matches with personal identification information which is previously registered. Thus, when correct personal identification information is input, a user can view programs for which the viewing is limited. Further, the user can check the contents of a program for which the viewing is limited to subsequently set whether the limiting of the viewing of the program is cancelled or not.

Furthermore, the selection unit inputs an input signal for updating the rating information stored in the storing unit. When the input signal for updating the rating information stored in the storing unit is inputted by the selection unit, the display control unit displays the rating information stored in the storing unit on the display section. Thus, a viewing lock level of a program can be set while user checks the contents of the program and the currently-set viewing lock level. As a result, a viewing lock can be set more securely.

In accordance with a second aspect of the invention, a program viewing control apparatus comprises:

a detection unit for detecting rating information regarding a viewing lock level of contents, which is added to data of the contents;

a storing unit for storing rating information regarding the viewing lock level;

a control unit for locking the contents based on comparison between the rating information detected by the detection unit and the rating information stored in the storing unit;

a selection unit for inputting a selection signal for selecting whether to limit viewing of the contents or not when contents video based on data of the contents is displayed on a display section; and an update unit for updating the rating information stored in the storing unit based on the selection signal inputted from the selection unit.

According to the second aspect of the invention, the detection unit detects the rating information regarding a viewing lock level of contents, which is added to data of the contents. The storing unit stores rating information regarding a viewing lock level. The control unit compares the rating information detected by the detection unit with the rating information stored in the storing unit to lock the contents. The selection unit inputs a selection signal for selecting whether to limit the viewing of the contents or not when the contents video based on the contents data is displayed on the display section. The update unit updates the rating information stored in the storing unit based on the selection signal inputted from the selection unit. Thus, a user can determine whether to limit the viewing of the contents or not while user actually views the contents. Therefore, the user can securely lock the contents to be locked without knowing the viewing lock level of the contents. Further, the viewing lock can be set in an easier and more secure manner.

Preferably, the update unit updates the rating information stored in the storing unit so that the viewing of contents having not less than the viewing lock level of the contents is limited when the selection signal for limiting the viewing of the contents is inputted from the selection unit; and the update unit updates the rating information stored in the storing unit so that the viewing of contents having not more than the viewing lock level of the contents is allowed when the selection signal for not limiting the viewing of the contents is inputted from the selection unit.

According to the present invention, specifically, when the selection signal for limiting the viewing of the contents is inputted from the selection unit, the update unit updates the rating information stored in the storing unit so that the viewing of contents having not less than the viewing lock level of the contents is limited. When the selection signal for not limiting the viewing of the contents is inputted from the selection unit, the update unit updates the rating information stored in the storing unit so that the viewing of contents having not more than the viewing lock level of the contents is allowed. Thus, the setting of a viewing lock level for one kind of contents enables the setting of a viewing lock level for contents having a viewing lock level equal to or higher than the viewing lock level of the one kind of contents. Therefore, a viewing lock level can be set in a more efficient manner.

Preferably, the program viewing control apparatus further comprises:

a personal identification information input unit for inputting personal identification information;

wherein the update unit verifies the personal identification information inputted from the personal identification information input unit and updates the rating information stored in the storing unit based on the selection signal inputted from the selection unit when the personal identification information inputted from the personal identification information input unit matches with personal identification information which is previously registered.

According to the invention, specifically, the personal identification information input unit inputs personal identification information, the update unit verifies the personal identification information inputted from the personal identification information input unit and updates the rating information stored in the storing unit based on the selection signal inputted from the selection unit when the personal identification information inputted from the personal identification information input unit matches with personal identification information which is previously registered. Thus, only a person knowing the personal identification information can set a viewing lock to prevent a child not knowing the personal identification number for example from tampering the setting of a viewing lock.

Preferably, the program viewing control apparatus further comprises:

a personal identification information input unit for inputting personal identification information;

wherein in case that the control unit limits the viewing of the contents, the update unit verifies the personal identification information inputted from the personal identification information input unit and cancels the limiting of the viewing of the contents when the personal identification information inputted from the personal identification information input unit matches with personal identification information which is previously registered.

According to the invention, specifically, the personal identification information input unit inputs personal identification information. In case that the control unit limits the viewing of the contents, the update unit verifies the personal identification information inputted from the personal identification information input unit and cancels the limiting of the viewing of the contents when the personal identification information inputted from the personal identification information input unit matches with personal identification information which is previously registered. Thus, when correct personal identification information is input, a user can view programs for which the viewing is limited. Further, the user can check the contents of a program for which the viewing is limited to subsequently set whether the limiting of the viewing of the program is cancelled or not.

Preferably, the selection unit inputs an input signal for updating the rating information stored in the storing unit, and the program viewing control apparatus further comprises a display control unit for causing the rating information stored in the storing unit to be displayed on the display section, when the input signal for updating the rating information stored in the storing unit is inputted from the selection unit.

According to the invention, specifically, the selection unit inputs an input signal for updating the rating information stored in the storing unit. When the input signal for updating the rating information stored in the storing unit is inputted by the selection unit, the display control unit displays the rating information stored in the storing unit on the display section. Thus, a viewing lock level of a program can be set while user checks the contents of the program and the currently-set viewing lock level. As a result, a viewing lock can be set more securely.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein.

PREFERRED EMBODIMENT OF THE INVENTION

Hereinafter, the preferred embodiment of a video display apparatus according to the present invention will be explained in detail with reference to the drawings. Although in this embodiment, a digital TV is explained as an example of the program viewing control apparatus, the scope of the present invention is not limited to this.

Figure 1:
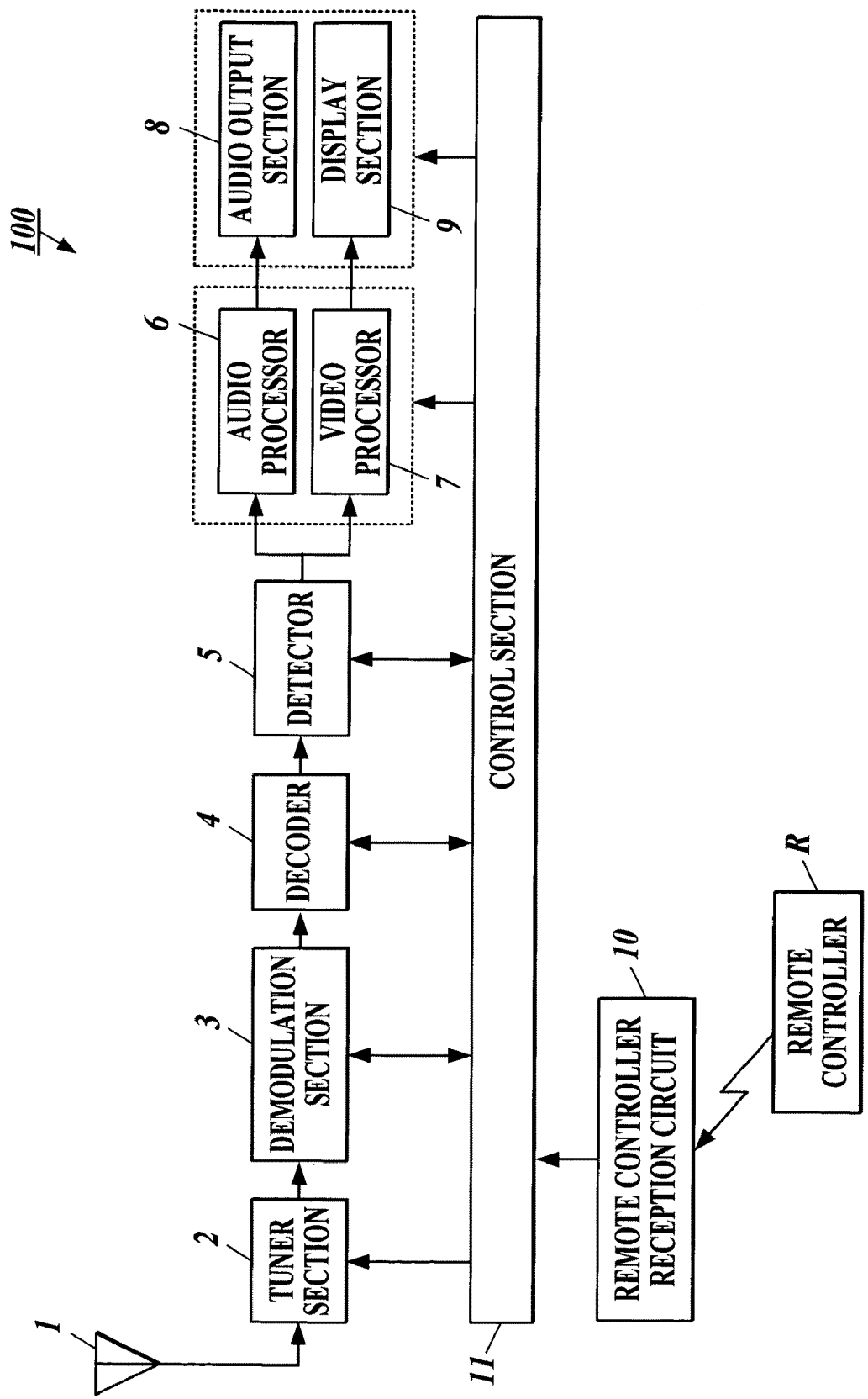
FIG. 1 is a diagram illustrating the outline of the structure of a digital TV according to according to the first embodiment of the present invention.
Figure 2:
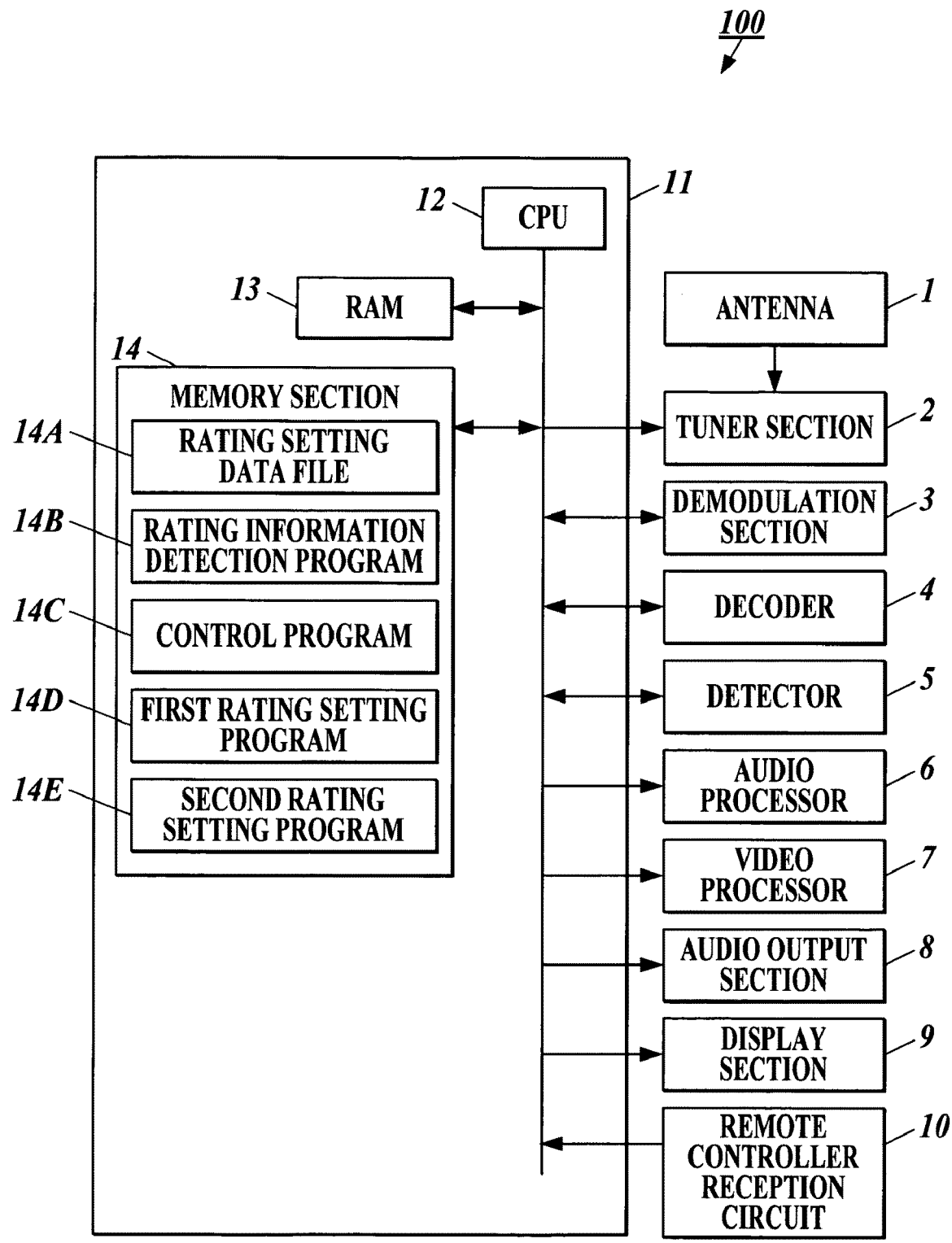
FIG. 2 is a block diagram illustrating the structure of a digital TV according to the first embodiment of the present invention.

First, the structure of a digital TV 100 according to the present invention will be described with reference to FIG. 1 and FIG. 2. The digital TV 100 according to this embodiment comprises, for example, an antenna 1, a tuner section 2, a demodulation section 3, a decoder 4, a detector 5, an audio processor 6, a video processor 7, an audio output section 8, a display section 9, a remote controller reception circuit 10, a remote controller R, and a control section 11 as shown in FIG. 1 and FIG. 2.

The antenna 1 is a satellite dish antenna or a UHF antenna for example that receives a broadcast wave including a television broadcasting signal, such as ground wave digital broadcasting, BS or CS broadcasting, to output an RF signal, such as ground wave digital signal, BS or CS broadcasting signal, to the tuner section 2. When a broadcast wave is received via a CATV line, for example, a connection cable (not shown) may also be provided.

The tuner section 2 comprises a mixer (not shown), a channel select circuit (not shown), and an A/D conversion circuit (not shown) for example. The mixer and the channel select circuit and the like convert an RF signal inputted from the antenna 1 to an Intermediate Frequency (IF) signal of a channel desired by a user. Then, the generated IF signal is converted by the A/D conversion circuit to digital data.

The demodulation section 3, for example, receives the digital data from the tuner section 2 to carry out a demodulation processing and the like for the data to output the data to the decoder 4.

The decoder 4, for example, carries out a decoding processing and the like for the digital data inputted from the demodulation section 3, for example, to generate program data (contents data) having an audio signal and a video signal, and rating information added to the program data to output the data to detector 5.

The term "rating information" herein means information regarding a viewing lock level of a program (contents). More specifically, as rating information, for example, the one complying with Motion Picture Association of America (MPAA) or the one complying with TV Viewing Guidelines, is known. The viewing lock levels for TV programs include those determined based on an age of the viewer and those determined based on the contents of the program and the like. The former group includes TV-Y (All Children; a program appropriate for all children), TV-Y7 (Directed Older Children; a program appropriate for children of seven or more years old), TV-G (General Audience; a program for general audience), TV-PG (Viewing Guidance Suggested; a program that is preferably viewed under the control by a guardian), TV-14 (Parents Strongly Cautioned; a program that requires attention by a guardian), and TV-MA (Mature Audience Only; a program for adults) and the like. The latter group includes V (Violence; a program including a violent expression), F/V (Fantasy Violence; a program including a violent expression in fantasy), S (Sexual Situation; a program including a sexual scene), L (Coarse Language; a program including a coarse language), and D (Suggestive Dialogue; a program including a suggestive dialogue) and the like.

The detector 5 is controlled by a CPU 12 (which will be described later) in such a manner that the CPU 12 executes a rating information detection program 14B (which will be described later). The detector functions as a detection unit that detects rating information added to program data outputted from the decoder 4.

The audio processor 6 comprises a mute circuit (not shown) and the like and is controlled in such a manner that the CPU 12 executes a control program 14C (which will be described later). The audio processor 6 carries out a mute processing for an audio signal outputted from the decoder 4, and the like.

The video processor 7 comprises a mute circuit (not shown) and is controlled in such a manner that the CPU 12 executes a control program 14C. The video processor 7 carries out a mute processing for a video signal outputted from the decoder 4, and the like. For example, the video processor 7 is controlled in such a manner that the CPU 12 executes the first rating setting program 14D or the second rating setting program 14E (which will be described later). The video processor 7 synthesizes OSD display data for causing the display section 9 to display rating information with a video signal outputted from the decoder 4.

The audio output section 8 comprises a speaker and the like and outputs audio based on an audio signal outputted from the audio processor 6.

The display section 9 comprises a Liquid Crystal Display (LCD), a Plasma Display Panel (PDP) or the like and displays video based on a video signal outputted from the video processor 7.

The remote controller reception circuit 10, for example, outputs an operation signal outputted from the remote controller R to the control section 11. More specifically, the remote controller reception circuit 10 converts an infrared light signal from the remote controller R to an electric signal to output the signal to the control section 11.

The remote controller R comprises, for example, various keys for inputting various operation signals and the like. The remote controller R is operated by a user to output various operation signals to the control section 11 via the remote controller reception circuit 10.

More specifically, for example, the remote controller R outputs an input signal for updating rating information described in a rating setting data file 14A (which will be described later) to the control section 11. The remote controller R also functions as a selection unit that outputs a selection signal for selecting whether the viewing of the program (contents) is limited or not to the control section 11 when video (contents video) based on a video signal of program data (contents data) is displayed on the display section 9.

For example, the remote controller R also functions as a personal identification information input unit that outputs a personal identification number (personal identification information) to the control section 11.

As shown in FIG. 2, the control section 11 comprises, for example, the CPU (Central Processing Unit) 12, a Random Access Memory (RAM) 13, and a memory section 14 and the like.

The CPU 12 reads out a processing program stored in the memory section 14 to expand the processing programs in the RAM 13, and controls the entire digital TV 100.

The RAM 13 expands the processing program executed by the CPU 12 and the like in a program storage region of the RAM 13 and stores input data, the processing result and the like obtained when the above processing program is executed in a data storage region.

The memory section 14 has, for example, a recording medium (not shown) in which a program, data or the like is previously stored. This recording medium comprises a semiconductor memory or the like. The memory section 14 stores various data for allowing the CPU 12 to realize a function to control the entire digital TV 100, various processing program, and data processed by executing these programs and the like. More specifically, for example, the memory section 14 stores therein the rating setting data file 14A, the rating information detection program 14B, the control program 14C, the first rating setting program 14D, the second rating setting program 14E and the like as shown in FIG. 2.

The rating setting data file 14A stores therein viewing lock level rating information for limiting the viewing by the digital TV 100 for example. The memory section 14 functions as a storing unit that stores therein such a rating setting data file 14A.

For example, the rating information detection program 14B is a program that allows the CPU 12 to realize a function to control the detector 5 to detect rating information added to program data.

For example, the control program 14C is a program that allows the CPU 12 to realize a function to compare rating information detected by the detector 5 with the rating information stored in the rating setting data file 14A to lock a program that is received by the antenna 1 and for which the channel is selected by the tuner section 2.

More specifically, the control program 14C is a program that allows the CPU 12 to realize a function; to judge whether the rating information detected by the detector 5 has a viewing lock level that is not less than the viewing lock level of the rating information stored in the rating setting data file 14A or not; to control the audio processor 6 and the video processor 7 to carry out a mute processing and the like for an audio signal and a video signal of the program to lock the program, when it is determined that the rating information detected by the detector 5 has a viewing lock level which is not less than the viewing lock level of the rating information stored in the rating setting data file 14A; and to skip the mute processing by the audio processor 6 and the video processor 7 not to output the audio signal and the video signal of the program data to the audio output section 8 and the display section 9, when it is determined that the rating information detected by the detector 5 has a viewing lock level which is lower than the viewing lock level of the rating information stored in the rating setting data file 14A. Therefore, the viewing of the program is authorized.

By executing the control program 14C as described above, the CPU 12 functions as a control unit.

In case that a control for authorizing the viewing of the program by executing the control program 14C is performed, for example, the first rating setting program 14D is a program that allows the CPU 12 to realize functions; to verify the personal identification number inputted from the remote controller R, when an input signal for updating the rating information stored in the rating setting data file 14A is inputted from the remote controller R; to cause the rating information stored in the rating setting data file 14A to be displayed on the display section 9 when the personal identification number matches with a personal identification number which is previously registered; and to update the rating information stored in the rating setting data file 14A based on the selection signal inputted from the remote controller R. By executing the first rating setting program 14D as described above, the CPU 12 functions as a part of a display control unit and a part of an update unit.

In case that a control for limiting the viewing of the program by executing the control program 14C is performed, for example, the second rating setting program 14E is a program that allows the CPU 12 to realize functions; to verify the personal identification number inputted from the remote controller R when an input signal for updating the rating information stored in the rating setting data file 14A is inputted from the remote controller R; to provide a control for authorizing the viewing of the program to cause the rating information stored in the rating setting data file 14A to be displayed on the display section 9 when the personal identification number matches with a personal identification number which is previously registered; and to update the rating information stored in the rating setting data file 14A based on the selection signal inputted from the remote controller R. By executing the second rating setting program 14E as described above, the CPU 12 functions as a part of a display control unit and a part of an update unit.

Figure 3A:
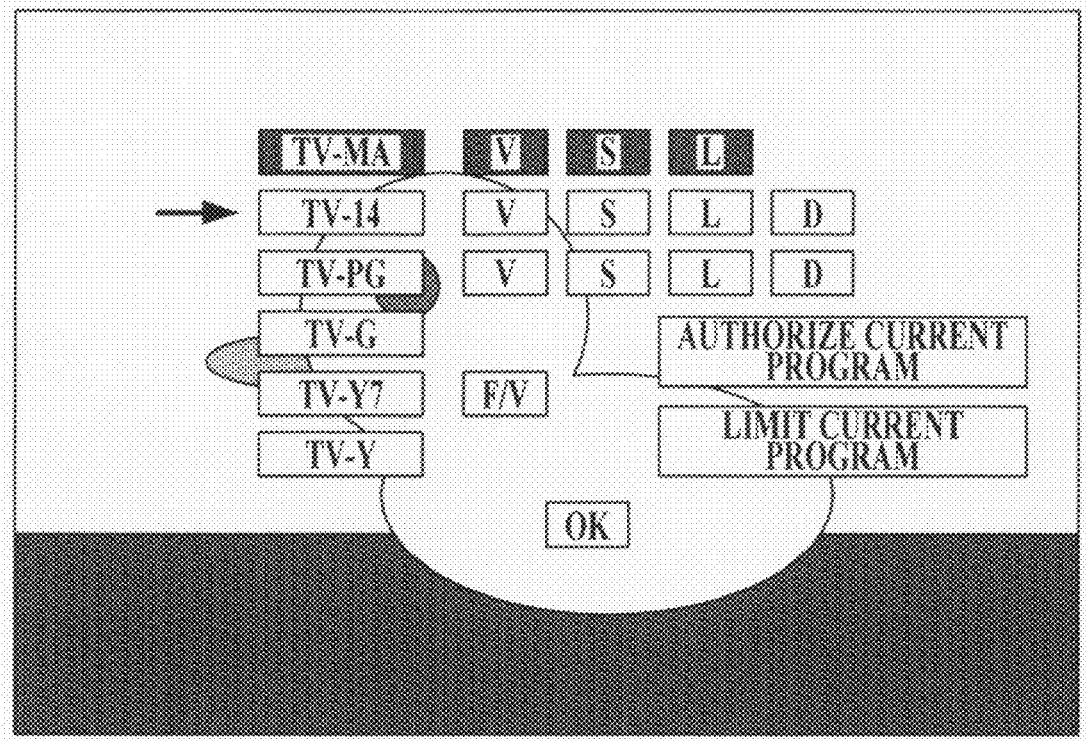
FIGS. 3A and 3B illustrate an example of a set of rating information displayed on a display section according to the present invention.
Figure 3B:
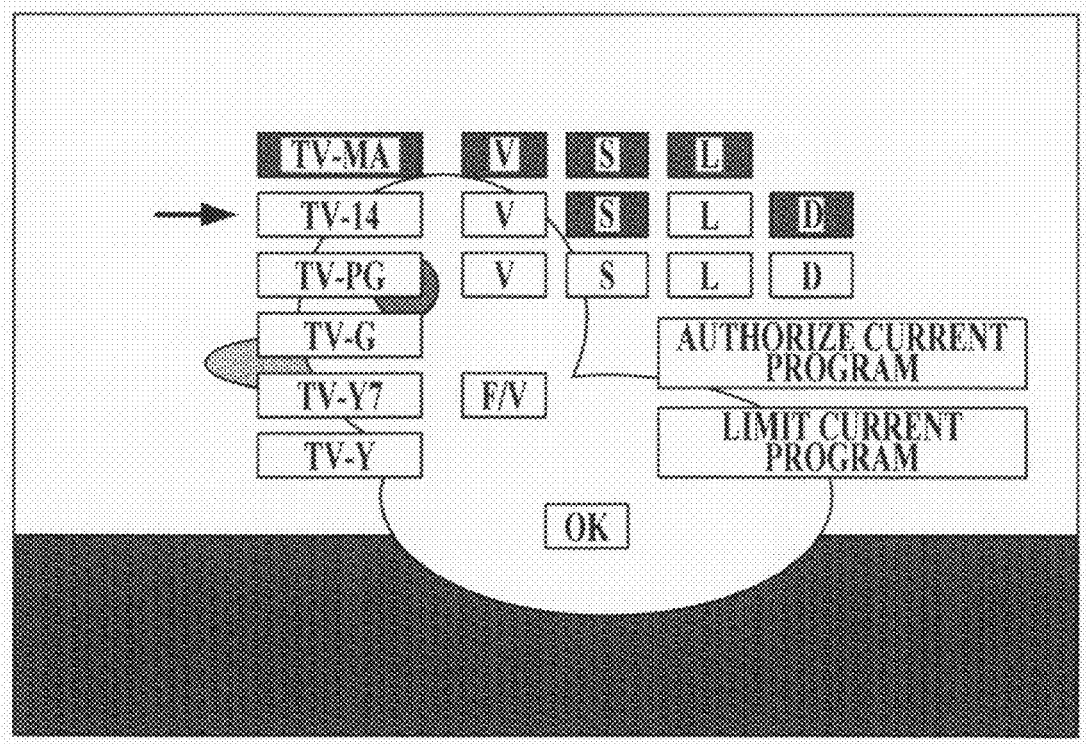

FIGS. 3A and 3B illustrate an example of a screen displayed on the display section 9 when the CPU 12 executes the first rating setting program 14D or the second rating setting program 14E. As shown in FIGS. 3A and 3B, the display section 9 displays the video based on the video signal of the program data and displays rating information, such as "TV-MA", "TV-14", "TV-PG", "TV-G", "TV-Y7", "TV-Y", "V", "F/V", "S", "L", and "D" and the like, on the video by an OSD display. The display section 9 also displays "authorize the current program", "limit the current program", "OK" and the like by an OSD display. The display section 9 also displays an arrow showing a viewing lock level of a currently-viewed program.

In FIG. 3A, the rating information of the rating setting data file 14A which is not changed is also displayed and a "TV-MA" or higher viewing lock level used as a limitation criteria in the digital TV 100 ("TV-MA" and "V", "S", and "L" at the viewing lock level) are displayed by outline characters. In FIG. 3A, an arrow showing the viewing level of the currently-viewed program is displayed at "TV-14". This means that the viewing of the current program is not limited in FIG. 3A.

When the remote controller R is used to select "limit the current program", the screen displayed on the display section 9 in FIG. 3A is changed to the screen as shown in FIG. 3B in which viewing lock levels which are not less than the viewing lock level of the current program ("V", "S", and "L" of "TV-MA" and "S" and "D" of "TV-14") are displayed by outline characters. When the remote controller R is used to select "OK" in FIG. 3B, viewing lock levels which are not less than "S" and "D" of "TV-14" and which are the viewing lock level of the current program are stored in the rating setting data file 14A as rating information.

Figure 4:
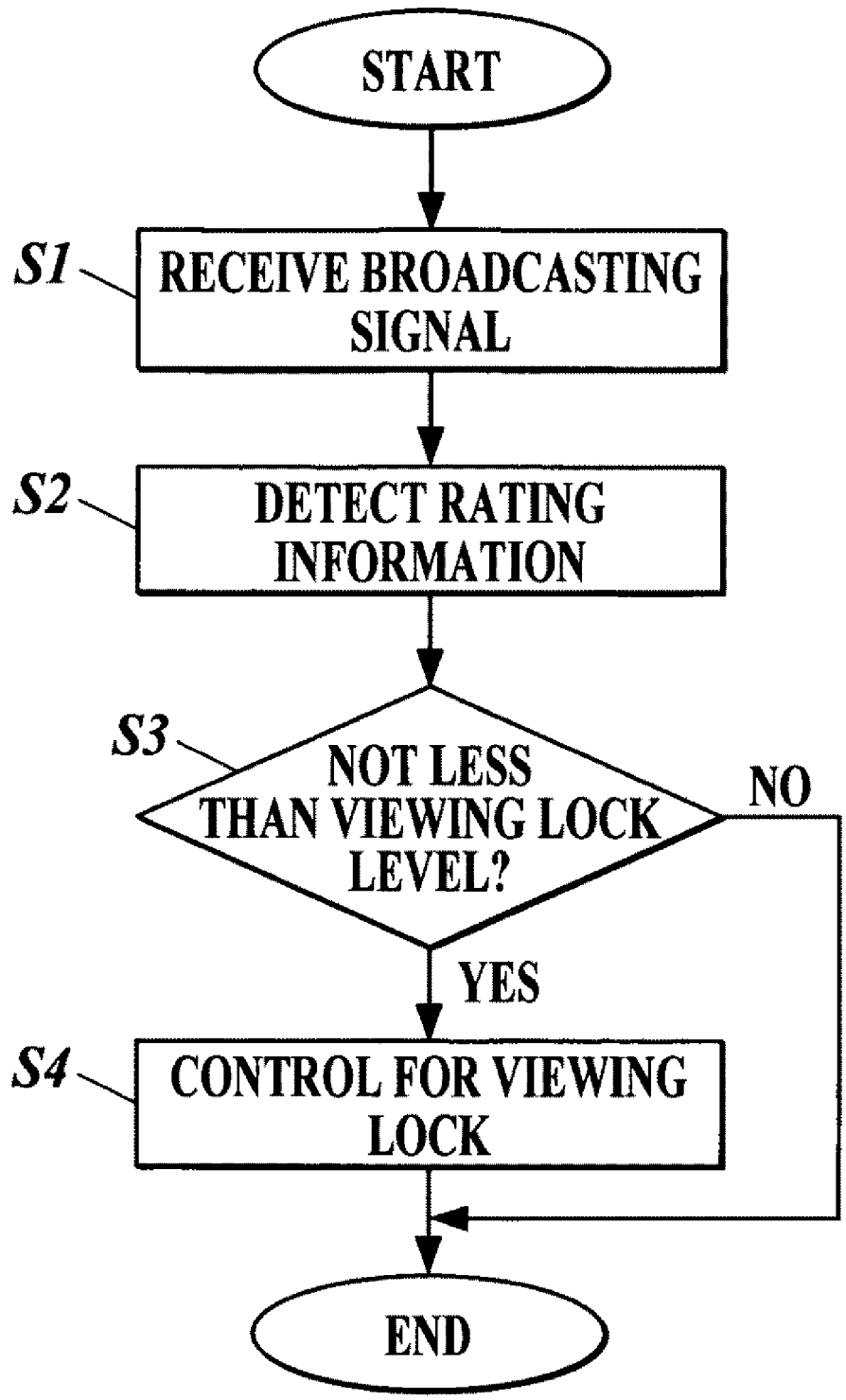
FIG. 4 is a flowchart illustrating an example of an operation for setting a viewing lock in a digital TV according to the present invention.

Next, an operation for locking a video signal in the digital TV 100 having the structure as described above will be explained with reference to a flowchart shown in FIG. 4.

First, a broadcasting signal is received by the antenna 1. Based on this broadcasting signal, the tuner section 2 generates digital data of a channel desired by a user. The digital data is demodulated by the demodulation section 3. Based on the demodulated digital data, the decoder 4 generates program data having an audio signal and a video signal and rating information added to the program data (Step S1).

Next, the CPU 12 executes the rating information detection program 14B to control the detector 5 to detect rating information added to program data (Step S2).

Next, the CPU 12 executes the control program 14C to judge whether the rating information detected by the detector 5 has a viewing lock level which is not less than the viewing lock level of the rating information stored in the rating setting data file 14A or not (Step S3).

In Step S3, when the CPU 12 determines that the rating information detected by the detector 5 has a viewing lock level which is not less than the viewing lock level of the rating information stored in the rating setting data file 14A (Step S3; Yes), the CPU 12 controls the audio processor 6 and video processor 7 to carry out a mute processing and the like for the audio signal and the video signal of the program. Therefore, the program is locked (Step S4).

In Step S3, when the CPU 12 judges that the rating information detected by the detector 5 has a viewing lock level which is lower than the viewing lock level of the rating information stored in the rating setting data file 14A (Step S3; No), the CPU 12 completes this processing. Specifically, a mute processing to be carried out by the audio processor 6 and the video processor 7 is skipped and the audio signal and the video signal of the program data are outputted by the audio output section 8 and display section 9. Therefore, the viewing of the program is authorized.

Figure 5:
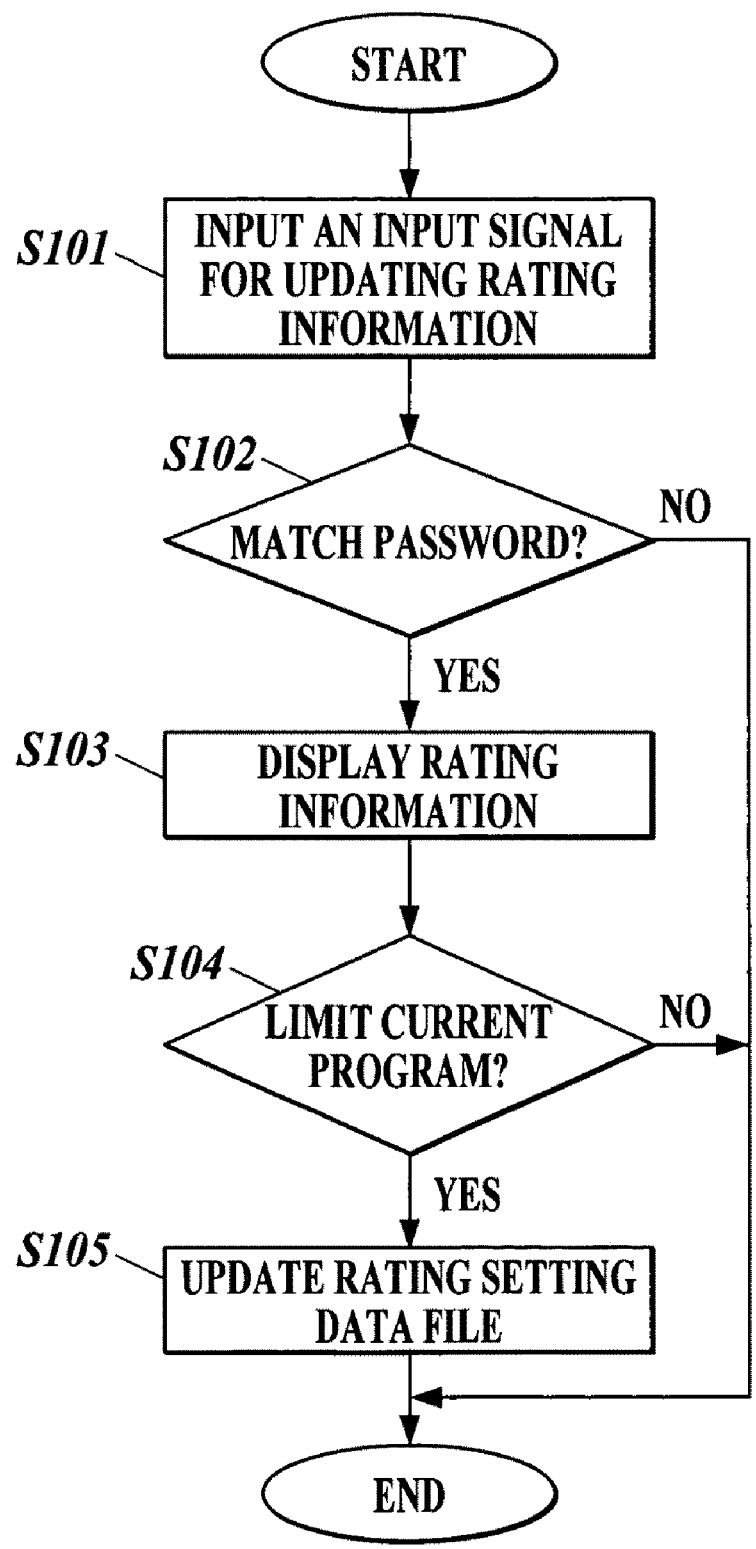
FIG. 5 is a flowchart illustrating an example of an operation for setting a viewing lock in a digital TV according to the present invention when no viewing lock is set yet.

Next, an operation for setting a viewing lock in the digital TV 100 according to this embodiment when no viewing lock is set will be described with reference to the flowchart shown in FIG. 5.

First, in case that the viewing of a program of a channel selected from broadcasting signals received by the antenna 1 is not limited, when an input signal for updating the rating information stored in the rating setting data file 14A is inputted from the remote controller R (Step S101), the CPU 12 executes the first rating setting program 14D to cause, for example, the display section 9 to display "please input your personal identification number" by an OSD display so that a personal identification number inputted from the remote controller R can be verified (Step S102).

In Step S102, when the CPU 12 judges that the personal identification number inputted from the remote controller R does not match with a personal identification number which is previously registered (Step S102; No), this processing is completed.

In Step S102, when the CPU 12 judges that the personal identification number inputted from the remote controller R matches with the personal identification number which is previously registered (Step S102; Yes), the CPU 12 causes, for example, the display section to display the rating information stored in the rating setting data file 14A, "authorize the current program", "limit the current program", and "OK" and the like by an OSD display as shown in FIG. 3 (Step S103).

Next, the CPU 12 judges whether "limit the current program" and "OK" are selected by the remote controller R or not and judges whether to limit the viewing of the program displayed on the display section 9 or not (Step S104).

In Step S104, when the CPU 12 judges that "authorize the current program" and "OK" are selected by the remote controller R and judges that the viewing of the program displayed on the display section 9 is authorized (Step S104; No), this processing is completed.

In Step S104, when the CPU 12 judges that "limit the current program" and "OK" are selected by the remote controller R and judges that the viewing of the program displayed on the section 9 is limited (Step S104; Yes), the CPU 12 updates the rating information stored in the rating setting data file 14A so that the viewing of a program having not less than the viewing lock level of the rating information of the program displayed on the display section 9 is limited (Step S105).

Figure 6:
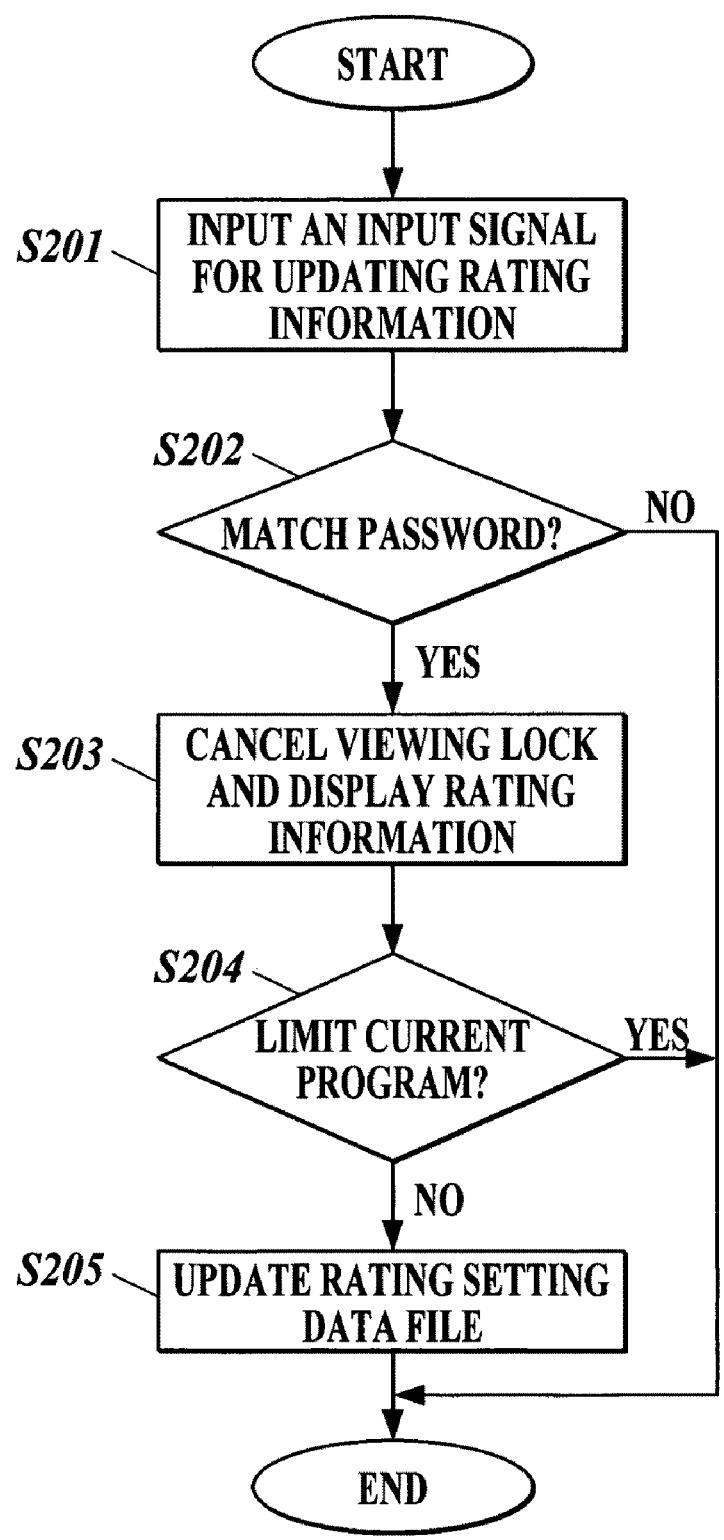
FIG. 6 is a flowchart illustrating an example of an operation for setting a viewing lock in a digital TV according to the present invention when a viewing lock is set.

Next, an operation for setting a viewing lock in the digital TV 100 according to this embodiment when a viewing lock is set will be explained with reference to a flowchart shown in FIG. 6.

First, in case that the viewing of a program of a channel selected from broadcasting signals received by the antenna 1 is limited, when an input signal for updating the rating information stored in the rating setting data file 14A is inputted from the remote controller R (Step S201), the CPU 12 executes the first rating setting program 14D to cause, for example, the display section 9 to display "please input your personal identification number" by an OSD display so that a personal identification number inputted from the remote controller R can be verified (Step S202).

In Step S202, when the CPU 12 judges that the personal identification number inputted from the remote controller R does not match with a personal identification number which is previously registered (Step S202; No), this processing is completed.

In Step S202, when the CPU 12 judges that the personal identification number inputted from the remote controller R matches with the personal identification number which is previously registered (Step S202; Yes), the CPU 12 authorizes the viewing of the program that is received by the antenna 1 and that has a channel selected by the tuner section 2 and causes the display section 9 to display the rating information stored in the rating setting data file 14A, "authorize the current program", "limit the current program", and "OK" and the like by an OSD display (Step S203).

Next, the CPU 12 judges whether "limit the current program" and "OK" are selected by the remote controller R or not and judges whether to limit the viewing of the program displayed on the display section 9 or not (Step S204).

In Step S204, when the CPU 12 judges that "limit the current program" and "OK" are selected by the remote controller R and judges that the viewing of the program displayed on the display section 9 is limited (Step S204; Yes), this processing is completed.

In Step S204, when the CPU 12 judges that "authorize the current program" and "OK" are selected by the remote controller R and judges the viewing of the program displayed on the display section 9 is authorized (Step S204; No), the CPU 12 updates the rating information stored in the rating setting data file 14A so that the viewing of the program having a viewing lock level which is not less than the viewing lock level of the rating information of the program displayed on the display section 9 is authorized (Step S205).

According to the digital TV 100 of the present invention as described above, the CPU 12 executes the rating information detection program 14B to control the detector 5 to detect rating information regarding a viewing lock level of the program, which is added to program data and the rating information of the viewing lock level is stored in the rating setting data file 14A and the CPU 12 executes the control program 14C to compare the rating information detected by the detector 5 with the rating information stored in the rating setting data file 14A, and to lock the program. When the remote controller R causes the program video based on the program data to be displayed on the display section 9, a selection signal for selecting whether to limit the viewing of the program or not is inputted and the CPU 12 executes the first rating setting program 14D or the second rating setting program 14E to update the rating information stored in the rating setting data file 14A based on the selection signal inputted from the remote controller R. Thus, a user can set whether to limit the viewing of a program or not while the user actually views the program. Therefore, the user can securely lock a program to be locked without knowing the viewing lock level thereof. Further, a viewing lock can be set in an easier and more secure manner.

Furthermore, the CPU 12 executes the first rating setting program 14D or the second rating setting program 14E to update rating information stored in the rating setting data file 14A so that the viewing of the program having not less than the viewing lock level of the program is limited, when an selection signal for limiting the viewing of the program is inputted from the remote controller R; and to update rating information stored in the rating setting data file 14A so that the program having not more than the viewing lock level of the program can be viewed, when a selection signal for not limiting the viewing of the program is inputted from the remote controller R. Thus, the setting of a viewing lock level for one program enables the setting of a viewing lock level for programs having a viewing lock level equal to or higher than the viewing lock level of the one program. Therefore, a viewing lock can be set in a more efficient manner.

A personal identification number is inputted by the remote controller R and the CPU 12 executes the first rating setting program 14D or the second rating setting program 14E to verify a personal identification number inputted by the remote controller R. When the personal identification number inputted by the remote controller R matches with a personal identification number which is previously registered, rating information stored in the rating setting data file 14A is updated based on the selection signal inputted from the remote controller R. Thus, only a person knowing the personal identification number can set the viewing lock to prevent a child not knowing the personal identification number for example from tampering the setting of a viewing lock.

When the personal identification number is inputted by the remote controller R and the CPU 12 executes the first rating setting program 14D and executes the control program 14C to limit the viewing of the program, the personal identification number inputted by the remote controller R is verified. When the personal identification number inputted by the remote controller R matches with a personal identification number which is previously registered, the limiting of the viewing of the program is cancelled. Thus, when a correct personal identification number is input, a user can view programs for which the viewing is limited. Further, the user can check the contents of a program for which the viewing is limited to subsequently set whether the limiting of the viewing of the program is cancelled or not.

Furthermore, when an input signal for updating rating information stored in the rating setting data file 14A is inputted from the remote controller R and when the CPU 12 executes the first rating setting program 14D or the second rating setting program 14E and an input signal for updating the rating information stored in the rating setting data file 14A is inputted from the remote controller R, the rating information stored in the rating setting data file 14A is displayed on the display section 9. Thus, a viewing lock level can be set while user checks the contents of the program and the currently-set viewing lock level. As a result, a viewing lock can be set more securely.

Although a digital TV is explained as an example of a program viewing control apparatus of the present invention, the program viewing control apparatus of the present invention also may be any apparatus so long as the apparatus can limit the viewing of the video based on a video signal. For example, the program viewing control apparatus of the present invention also may be a broadcasting reception apparatus such as a set top box or a DVD player and the like.

In this embodiment, rating information regarding a viewing lock level of a TV program is explained as an example. The present invention also can be applied to other kinds of rating information.

In this embodiment, a viewing lock level of a currently-viewed program is displayed by an arrow. The present invention is not limited to this. For example, a viewing lock level of a currently-viewed program also may be displayed by colored characters or the like.

The entire disclosure of Japanese Patent Application No. 2006-175626 filed on Jun. 26, 2006 is incorporated herein by reference in its entirety.

What is claimed is:

1. A program viewing control apparatus comprising:
a detection unit for detecting rating information regarding a viewing lock level of contents, which is added to data of the contents;
a storing unit for storing rating information regarding the viewing lock level;
a control unit for locking the contents based on comparison between the rating information detected by the detection unit and the rating information stored in the storing unit;
a selection unit for inputting an input signal for updating the rating information stored in the storing unit and inputting a selection signal for selecting whether to limit viewing of the contents or not when contents video based on data of the contents is displayed on a display section;
a display control unit for causing the rating information stored in the storing unit to be displayed on the display section, when the input signal for updating the rating information stored in the storing unit is inputted from the selection unit;
an update unit for updating the rating information stored in the storing unit so that the viewing of contents having not less than the viewing lock level of the contents is limited when the selection signal for limiting the viewing of the contents is inputted from the selection unit, and for updating the rating information stored in the storing unit so that the viewing of contents having not more than the viewing lock level of the contents is allowed when the selection signal for not limiting the viewing of the contents is inputted from the selection unit; and
a personal identification information input unit for inputting personal identification information;
wherein in case that the control unit does not limit the viewing of the contents, the update unit verifies the personal identification information inputted from the personal identification information input unit and updates the rating information stored in the storing unit based on the selection signal inputted from the selection unit when the personal identification information inputted from the personal identification information input unit matches with personal identification information which is previously registered; and
wherein in case that the control unit limits the viewing of the contents, the update unit verifies the personal identification information inputted from the personal identification information input unit and cancels the limiting of the viewing of the contents when the personal identification information inputted from the personal identification information input unit matches with the personal identification information which is previously registered.

2. A program viewing control apparatus comprising:
a detection unit for detecting rating information regarding a viewing lock level of contents, which is added to data of the contents;
a storing unit for storing rating information regarding the viewing lock level;
a control unit for locking the contents based on comparison between the rating information detected by the detection unit and the rating information stored in the storing unit;
a selection unit for inputting a selection signal for selecting whether to limit viewing of the contents or not when contents video based on data of the contents is displayed on a display section; and
an update unit for updating the rating information stored in the storing unit based on the selection signal inputted from the selection unit.

3. The program viewing control apparatus as claimed in claim 2, wherein:
the update unit updates the rating information stored in the storing unit so that the viewing of contents having not less than the viewing lock level of the contents is limited when the selection signal for limiting the viewing of the contents is inputted from the selection unit; and
the update unit updates the rating information stored in the storing unit so that the viewing of contents having not more than the viewing lock level of the contents is allowed when the selection signal for not limiting the viewing of the contents is inputted from the selection unit.

4. The program viewing control apparatus as claimed in claim 2, further comprising:
a personal identification information input unit for inputting personal identification information;
wherein the update unit verifies the personal identification information inputted from the personal identification information input unit and updates the rating information stored in the storing unit based on the selection signal inputted from the selection unit when the personal identification information inputted from the personal identification information input unit matches with personal identification information which is previously registered.

5. The program viewing control apparatus as claimed in claim 2, further comprising:
a personal identification information input unit for inputting personal identification information;
wherein in case that the control unit limits the viewing of the contents, the update unit verifies the personal identification information inputted from the personal identification information input unit and cancels the limiting of the viewing of the contents when the personal identification information inputted from the personal identification information input unit matches with personal identification information which is previously registered.

6. The program viewing control apparatus as claimed in claim 2, wherein:
the selection unit inputs an input signal for updating the rating information stored in the storing unit, and
the program viewing control apparatus further comprises a display control unit for causing the rating information stored in the storing unit to be displayed on the display section, when the input signal for updating the rating information stored in the storing unit is inputted from the selection unit.

* * * * *